(12) United States Patent
McCurdy et al.

(10) Patent No.: US 7,988,315 B1
(45) Date of Patent: Aug. 2, 2011

(54) SIMULTANEOUS MULTIPLE LIGHT SOURCE VIEWER

(75) Inventors: Frederic McCurdy, Newburgh, NY (US); Raymond J Kallio, Newburgh, NY (US); Louis N Chappo, New Paltz, NY (US)

(73) Assignee: GTI Graphic Technology, Inc., Newburgh, NY (US)

( * ) Notice: Subject to any disclaimer, the term of this patent is extended or adjusted under 35 U.S.C. 154(b) by 0 days.

(21) Appl. No.: 12/982,936

(22) Filed: Dec. 31, 2010

(51) Int. Cl.
*A47F 11/10* (2006.01)

(52) U.S. Cl. ............. 362/125; 362/231; 362/217.11

(58) Field of Classification Search ............... 362/125, 362/133, 231, 249.02, 217.14–217.16, 217.11, 362/217.12
See application file for complete search history.

(56) References Cited

U.S. PATENT DOCUMENTS

| | | | | |
|---|---|---|---|---|
| 1,852,471 | A | * | 4/1932 | Nelson ............. 108/60 |
| 2,078,612 | A | * | 4/1937 | Shisler ............ 312/125 |
| 6,204,923 | B1 | | 3/2001 | Willing |

* cited by examiner

*Primary Examiner* — John A Ward

(57) ABSTRACT

A device for simultaneously illuminating objects with light from more than one light source for improved color matching and comparison that includes more than one light source, baffles for separating the light sources and for forming viewing slots, and a platform area in which samples can be simultaneously illuminated on separate portions by each light source.

16 Claims, 5 Drawing Sheets

SIMULTANEOUS MULTIPLE LIGHT SOURCE VIEWER

CROSS-REFERENCE TO RELATED APPLICATIONS

None.

STATEMENT REGARDING FEDERALLY SPONSORED RESEARCH OR DEVELOPMENT

Not applicable.

FIELD OF THE INVENTION

The invention relates to devices that assist with color matching and inspection, in particular to devices that provide light sources for visual color examination.

BACKGROUND OF THE INVENTION

The color an object appears depends on how light energy is absorbed by and reflected from the object. An object's color therefore depends not only on the nature of the object itself, but also on the composition of the light striking it. Different sources of light, such as sunlight, incandescent bulbs, and fluorescent lights, have different spectral power distributions. Therefore, objects can appear differently when viewed under different sources of light. Light sources with different spectral power distributions have different proportions of the various wavelengths of visible light and the reflection and absorption of those different proportions of visible light can result in objects or colors appearing differently when illuminated by different sources of light. Because of this phenomenon, it is common to view a color under more than one light source when performing such color tasks as color selection and color matching. Color stylists want to know what the appearance of an object or color will be under various lighting conditions, such as those present where the color or object will be on display. In addition, when matching one color to another, it is desirable to determine that a match is maintained under various lighting conditions.

Conventional multiple light source devices used for color matching of samples allow only one light source to be selected at a time. These kinds of devices have been used for the critical inspection, evaluation and matching of color with respect to a single light source. These devices are also often used for the aesthetic appraisal of a color under different light sources. Conventional multiple light source devices operate by having one light source on at a time. Each light source illuminates the samples sequentially in order to help a person viewing the samples determine whether two similar colors match. A match of two colors is deemed to be good when those two colors appear identical under all available light sources. However, because of the time lag that occurs when switching from one light source to the next, it is often difficult to judge the closeness of a match or to detect a mismatch due in part to the limited capacity of the user for color memory.

Another type of color evaluation device commonly used is a color rendition demonstrator. Conventional color rendition demonstrators do allow different light sources to be illuminated simultaneously, however, these devices are limited by the fact that they cannot accommodate commonly used light sources (such as long fluorescent light bulbs). Further, conventional color rendition demonstrators do not allow for viewing samples under different light sources simultaneously unless the samples are relatively large or separated by a significant distance, in which case it is more difficult for a user to compare them because the portions of the samples illuminated by different light sources would fall outside of the user's field of view in which subtle differences can be identified.

Therefore, there is a need for a device that can be used to simultaneously illuminate with more than one different light source separate areas of a sample within an appropriately narrow field of view.

SUMMARY OF THE INVENTION

It is an object of the invention to provide a multiple light source device that allows one or more objects or samples to be viewed under more than one light source simultaneously within an appropriate field of view such that different portions of the object or sample are illuminated by different light sources.

It is a further object of the invention to provide a device that includes multiple light sources separated by baffles such that the light from each source reaches the object or sample on a display area substantially unmixed with light from the other light sources.

It is an additional object of the invention to provide a simultaneous multiple light source viewer that includes a UV light source that provides light to substantially all portions of the display area.

It is an additional object of the invention to provide a simultaneous multiple light source viewer that includes height-adjustable baffles or display area in order to accommodate different sized objects or samples.

It is a further object of the invention to provide a simultaneous multiple light source viewer that can accommodate elongated light sources.

DETAILED DESCRIPTION OF PREFERRED EMBODIMENTS

Figure 1:
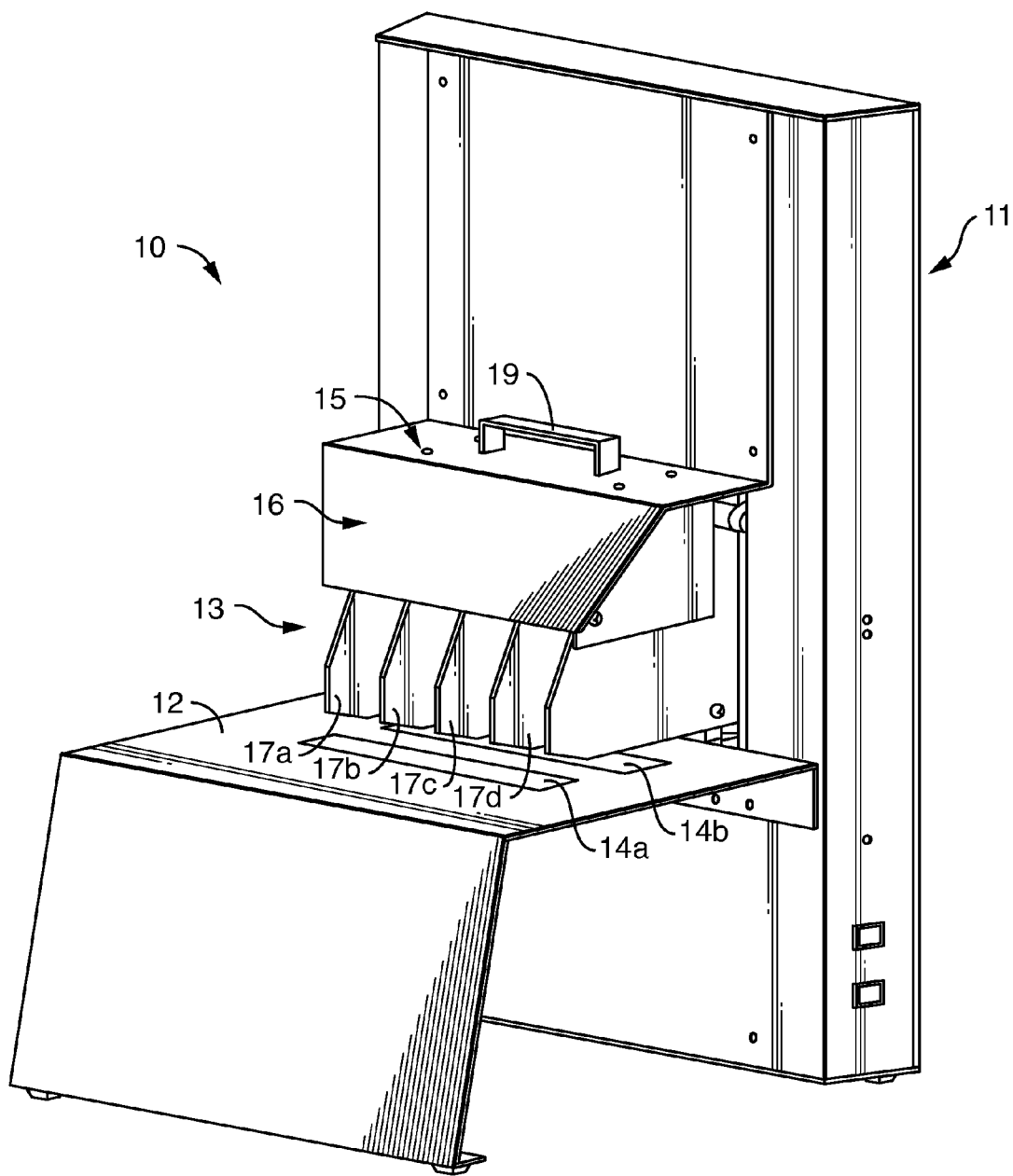
FIG. 1 depicts an embodiment of a multiple light source viewer of the present invention.

FIG. 1 shows an embodiment of a multiple light source viewer (10). The multiple light source viewer (10) includes a cabinet (11) to house different light sources, a platform area (12) for placing and viewing samples, and separating baffles (13). With light sources on, a sample (14a) on the platform area (12) will be simultaneously illuminated by each light source, with each light source illuminating separate portions of the sample (14a), and with the baffles (13) preventing mixture of the light from the different light sources. Panels (15, 16) can be situated on the baffles (13) so as to shield the light sources from directly shining into a user's eyes while allowing the user to view the sample (14a).

Similarly, the current invention allows more than one sample to be viewed while being illuminated by multiple light sources simultaneously. In FIG. 1, a second sample (14b) is side by side on the platform area (12) of multiple light source viewer (10). In this way, color matching can be performed by comparing samples under various light sources simultaneously.

Figure 2A:
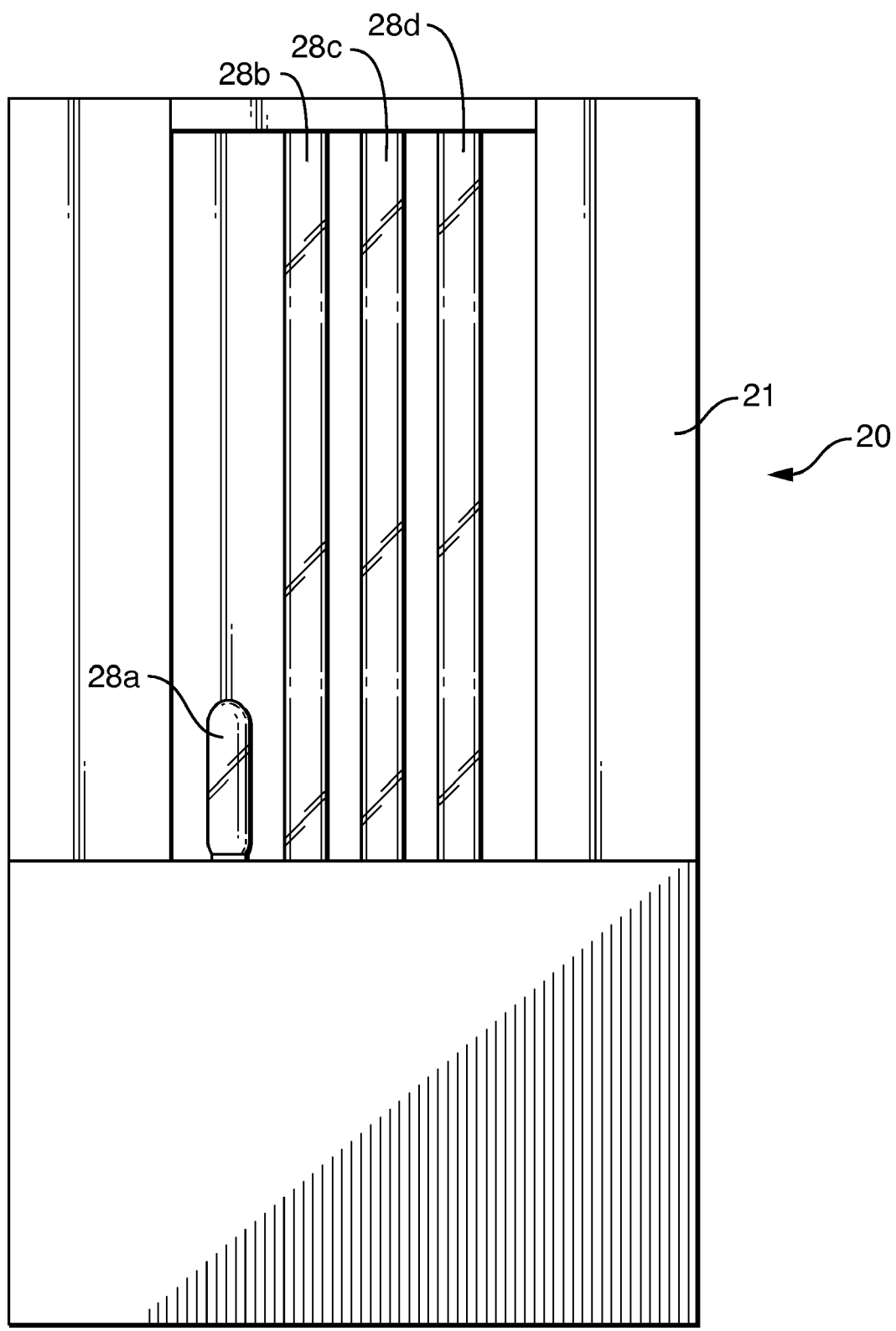
FIG. 2A depicts a multiple light source viewer with front portion removed.

The baffles (13) can extend from the back of the light source cabinet toward the platform area (12) in order to form slots (17a-d) for light from each respective light source (28a-d in FIG. 2A). The baffles (13) allow the light sources to illuminate a sample (14a) while preventing light from the light sources from intermixing. Preferably, the baffles (13) are height adjustable to accommodate samples of varying thicknesses. Height adjustable baffles can be provided by use of elongated slots coupled with support rods or other suitable mechanism. A handle (19) can be included to facilitate adjusting the height of the baffles and placement of samples.

Figure 2B:
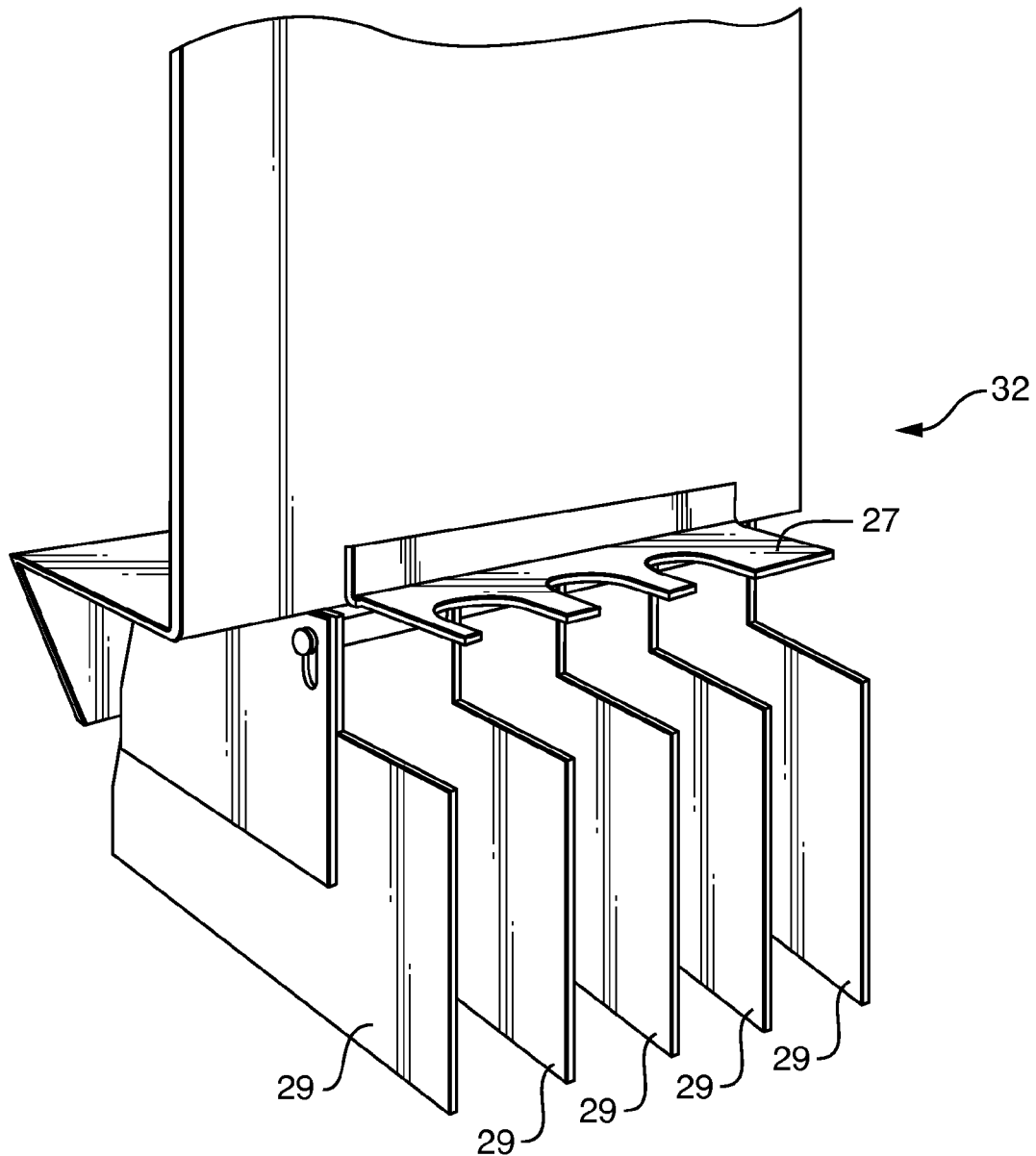
FIG. 2B depicts the front portion of the multiple light source viewer of FIG. 2A.

Light sources commonly used for visual color matching and color comparison include fluorescent and incandescent sources. Fluorescent sources may be selected for their similarity to natural daylight or to lighting found in retail environments. Other light sources can include LED sources or any other appropriate light sources. The multiple light source viewer of the invention can be designed to accommodate light sources of various shapes and sizes in a cabinet. The cabinet houses the light sources and is constructed so that light from one source does not significantly contaminate light from other sources. To this end, as shown for example in FIGS. 2A and 2B, baffles (29) separate each light source (28a-d) to avoid light contamination. In addition, an upper baffle (27) can be used to avoid light contamination and allow the separating baffles to be shorter than the entire length of the longest light source. The upper baffle (27) is designed to fit relatively closely around the shape of the light sources that are used. Alternatively, baffles can be included along the entire length of the cabinet (21), in which case an upper baffle would not be necessary. In FIGS. 2A and 2B, the separating baffles (29) are attached to the removable front portion (32) of the viewer (20). In the alternative, the baffles could be attached to the back of the cabinet (21). For ease of access to the light sources, however, it is preferable to have the separating baffles and upper baffle attached to front portion (32) so that upon opening or removing front portion (32), the light sources can be easily accessed for replacement or adjustment. A lower baffle may also be included in the cabinet to prevent ambient light from contaminating the separate light sources.

Figure 4:
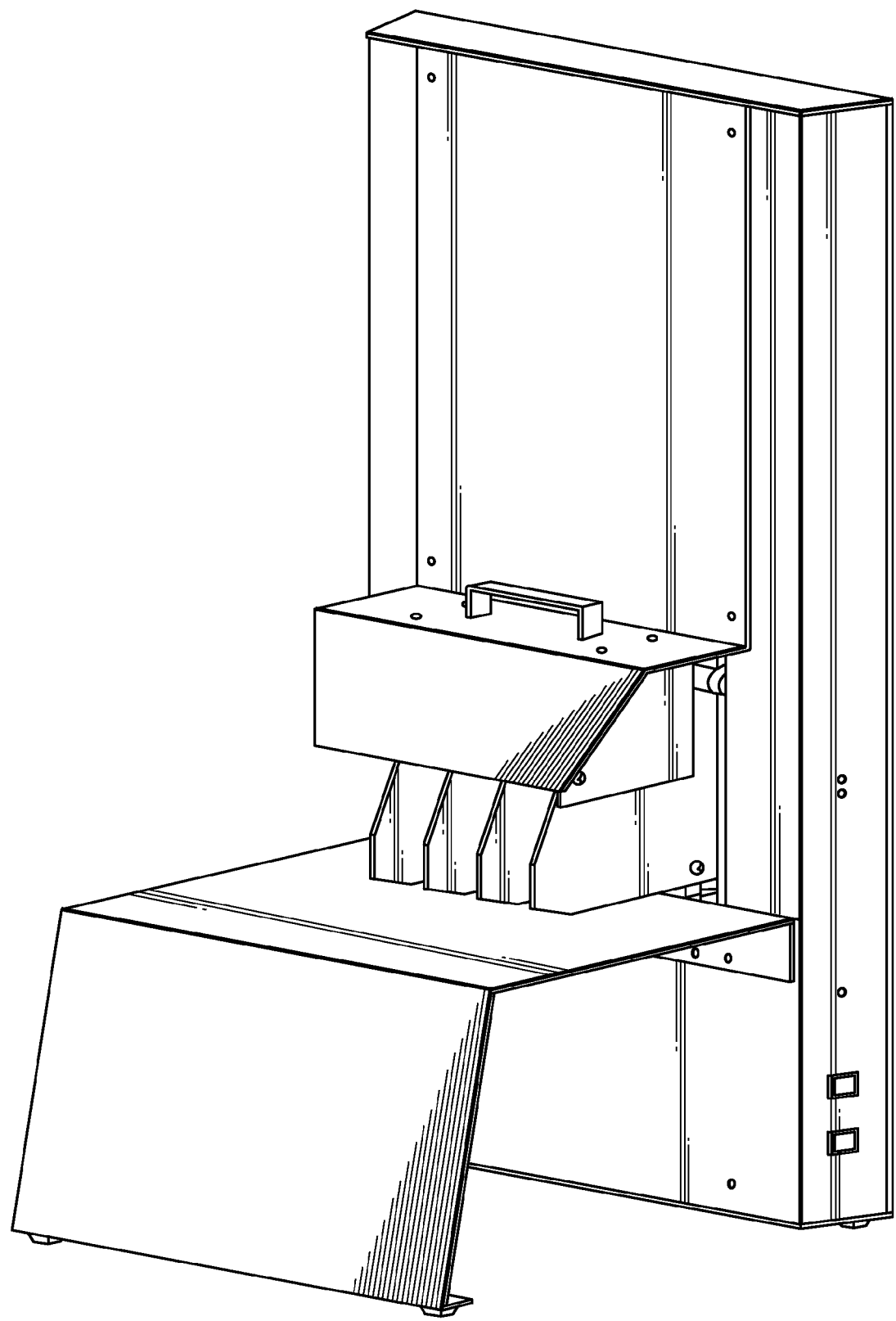
FIG. 4 depicts another embodiment of a multiple light source viewer of the present invention.

The cabinet may be designed to accommodate two foot long light sources (as shown in FIG. 1), four foot long light sources (as shown in FIG. 4), or shorter or longer light sources as necessary. The cabinet is designed to accommodate elongated light sources vertically, allowing the viewing area to remain relatively narrow. A relatively narrow viewing area, in which multiple light sources can illuminate separate areas of a sample, is important to assist a user when comparing the effect of different light sources on a sample and comparing the effect of different light sources across samples. Therefore, the distance across the viewing area is preferably relatively narrow. For example, the distance from the edge of slot 17a to the opposite edge of slot 17d in FIG. 1 could be seven inches in one embodiment, with each slot being about 1.75 inches wide. The width of the viewing area and the width of the slots can vary based on user preference and the number of slots. The viewing area from the left edge of the leftmost slot to the right edge of the rightmost slot can range from about 3 inches to about 15 inches. There can be as few as two slots (and hence two light sources) to as many as five or more slots for respective light sources.

In general, the multiple light source viewer can be made of any suitable materials, including metal, plastic, or wood. The cabinet, dividers and baffles must be made of a material that can withstand the temperatures that result from being in close proximity to the light sources used. Preferably, the interior cabinet walls, baffles, and dividers are constructed using high purity, diffuse finish, anodized aluminum reflector material in order to increase the amount of light reaching the viewing platform from the light sources.

Figure 3:
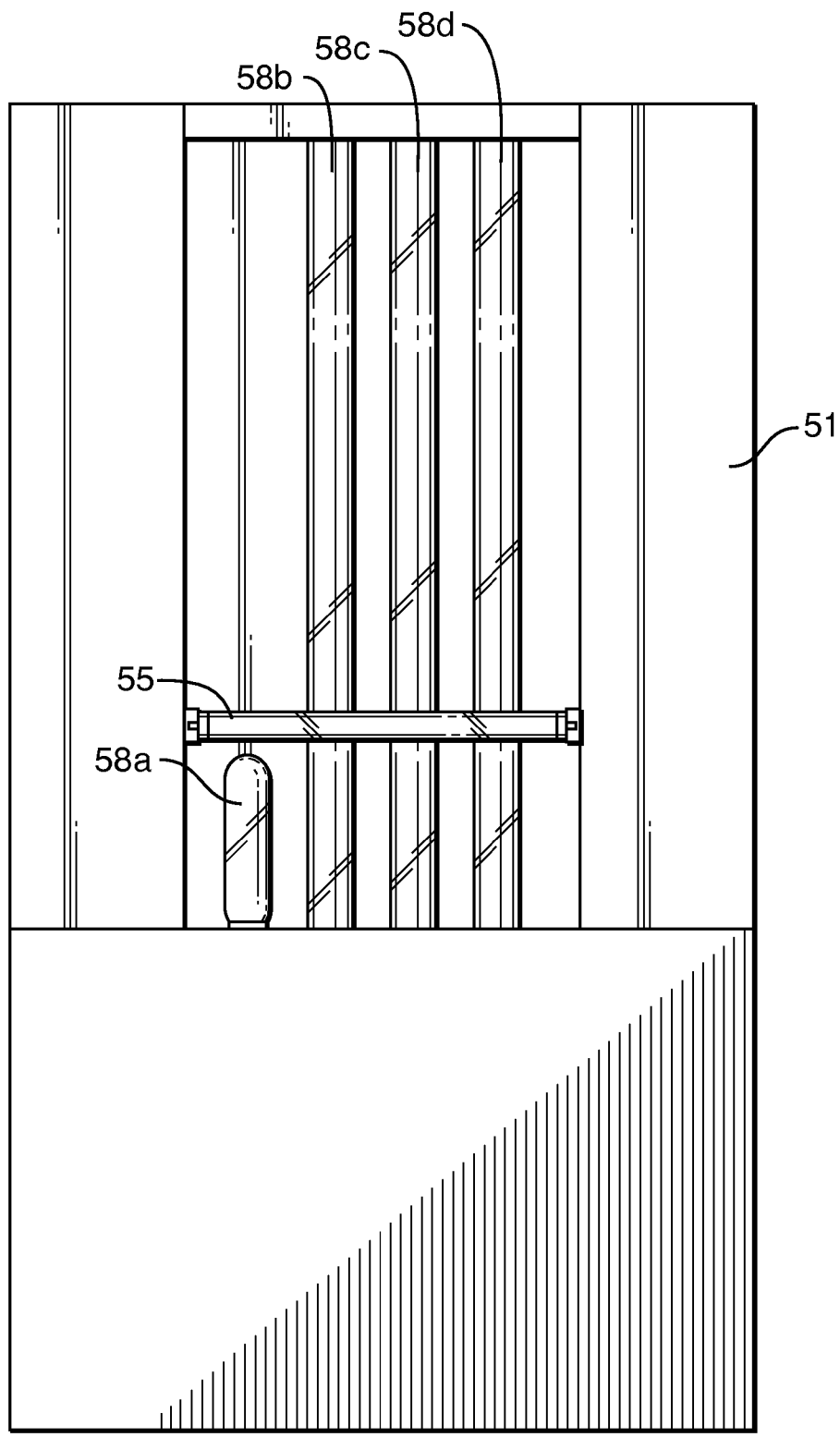
FIG. 3 depicts a multiple light source viewer with the front portion removed that includes a UV source.

In an alternative embodiment of the invention, as shown in FIG. 3, a UV light source (55) can be included in the cabinet (51) such that UV light will be included with the other light sources that reach samples (not shown in FIG. 3) on the platform area. UV light can be desirable for viewing textiles, for example, as it stimulates optical brighteners, which can affect appearance and color matching.

In operation, a sample is placed on the viewing platform and the height adjustable baffles are lowered until near or in contact with the sample. The light sources are switched on along with a UV light source, if included and desired, and the sample is viewed. Each portion of the sample that lies within a slot between baffles will be illuminated with a different light source. A user looking toward the viewing platform could see the entire sample when viewing from a relatively close proximity, such as about 18-36 inches, which may be required for careful inspection, and be able to see how the sample appears under the different light sources simultaneously. Further, with two samples on the viewing platform, a user would be more easily able to detect differences in appearance between the samples when illuminated under different light sources.

The multiple light source viewer of this invention can be made of a size that can fit on a desktop, table top, or countertop.

The invention claimed is:

1. A viewer for viewing samples illuminated simultaneously by more than one light source comprising:
    a cabinet for housing more than one light source wherein the light sources have different spectral distributions;
    a viewing platform; and
    baffles on either side of each light source extending from the light source to within less than one inch of the viewing platform such that a sample on the viewing platform can be illuminated by each of the light sources simultaneously, whereby the baffles form slots corresponding to each of the light sources and substantially prevent the light from the light sources from mixing.

2. The viewer of claim 1 wherein the slots are situated within a distance of about fifteen inches along the viewing platform.

3. The viewer of claim 1 wherein the slots are situated within a distance of about ten inches along the viewing platform.

4. The viewer of claim 1 wherein the cabinet additionally contains a UV light source such that UV light can enter each slot.

5. The viewer of claim 1 comprising three or more lights sources and slots.

6. The viewer of claim 1 comprising four or more lights sources and slots.

7. The viewer of claim 1 comprising five or more lights sources and slots.

8. The viewer of claim 2 comprising three or more lights sources and slots.

9. The viewer of claim 2 comprising four or more lights sources and slots.

10. The viewer of claim 2 comprising five or more lights sources and slots.

11. The viewer of claim 3 comprising three or more lights sources and slots.

12. The viewer of claim 3 comprising four or more lights sources and slots.

13. The viewer of claim 1 further including a cover across an upper and a frontal portion of the baffles which does not prevent light from the light sources from reaching the viewing platform.

14. The viewer of claim 13 wherein the baffles can be adjusted from being about in contact with the viewing platform to being about one inch above the viewing platform.

15. A device for simultaneously illuminating separate sections of a viewing area with more than one light source comprising:

a housing containing more than two light sources that have different spectral distributions;

a viewing area; and baffles on either side of each light source extending from the light source to near the viewing area such that a sample on the viewing platform can be illuminated by each of the light sources simultaneously, whereby the baffles form slots corresponding to each of the light sources and substantially preventing light from the spectrally different light sources from mixing and are situated such that the light from the different light sources can fall within a viewing range of about twelve inches across on the viewing area.

16. The device of claim 15 wherein the interior surfaces of the housing around the light sources and the baffles includes high purity, diffuse finish, anodized aluminum reflector material.

* * * * *